Jan. 14, 1964   I. HALASZ ETAL   3,117,570
BLOOD PRESSURE MEASURING DEVICE
Filed Nov. 16, 1959   4 Sheets-Sheet 2
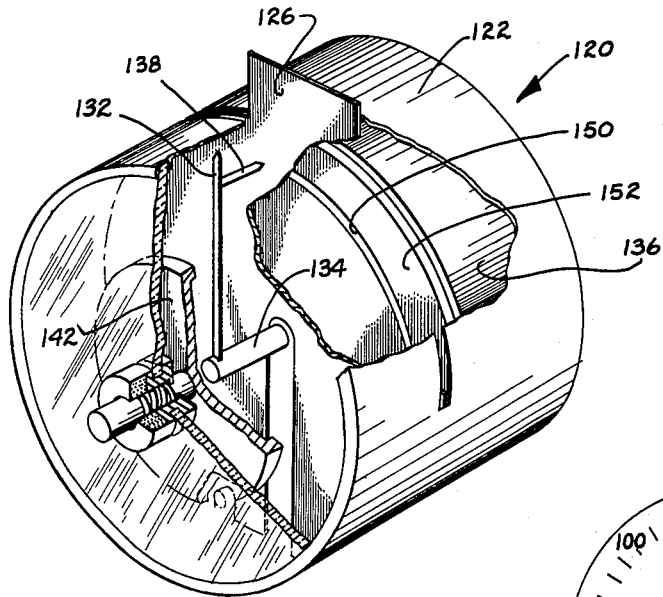
Fig. 2
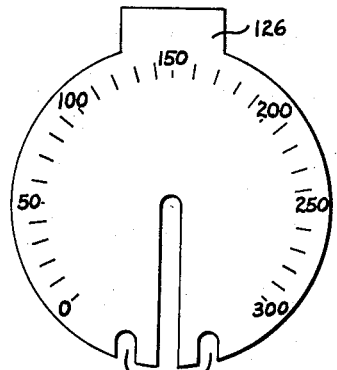
Fig. 5
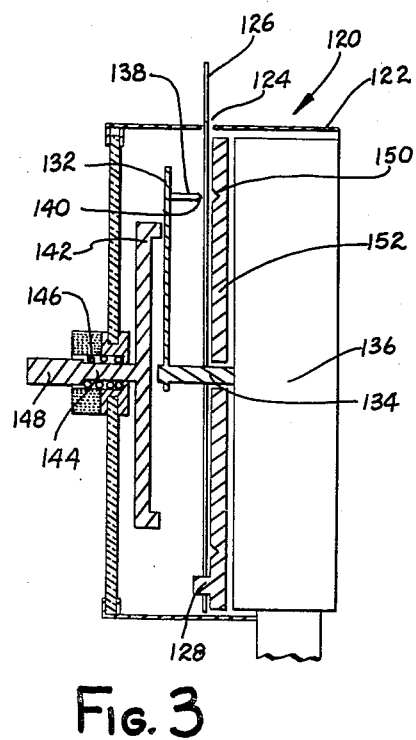
Fig. 3
Fig. 4
INVENTORS
ISTVAN HALASZ
LADISLAV L. EDINGER
BY Hammond & Littell
ATTORNEYS

INVENTORS
ISTVAN HALASZ
LADISLAV L. EDINGER

BY

ATTORNEYS

Jan. 14, 1964    I. HALASZ ETAL    3,117,570
BLOOD PRESSURE MEASURING DEVICE
Filed Nov. 16, 1959    4 Sheets-Sheet 4

INVENTORS
ISTVAN HALASZ
LADISLAV L. EDINGER

BY Hammond + Littell
ATTORNEYS

United States Patent Office 3,117,570
Patented Jan. 14, 1964

3,117,570
BLOOD PRESSURE MEASURING DEVICE
Istvan Halasz, Dorstener Strasse 227, Gelsenkirchen-Buer, Germany, and Ladislav Leslie Edinger, 1084 Allerton Ave., Bronx 69, N.Y.
Filed Nov. 16, 1959, Ser. No. 853,211
Claims priority, application Germany Nov. 19, 1958
3 Claims. (Cl. 128—2.05)

This invention relates to a device for measuring blood pressure, and more particularly to an electronic device suitable for use by unskilled personnel for the purpose of obtaining direct readings of systolic and diastolic blood pressure.

Systolic and diastolic blood pressure for diagnostic purposes is generally measured by doctors by means of apparatus consisting of an inflatable sleeve, a pressure gauge (usually a mercury column) for measuring the pressure in the sleeve, and a stethoscope which the doctor applies to the radial artery. The sleeve is blown up until the blood circulation stops and no pulse is heard in the stethoscope. As the sleeve is deflated, the stethoscope picks up the Korotkoff sound caused by the beginning of the pulse upon reaching the systolic blood pressure. Upon continuing deflation of the sleeve, the Korotkoff sound disappears upon reaching the diastolic blood pressure. This device is simple and the measurement is easily made. The measurements, however, are quite inaccurate and subjective and require some training.

Based on these simple devices, a large number of blood pressure measuring devices have been developed for the purpose of increasing the accuracy of measurement or to automate the measuring process. Such devices would also permit the making of many measurements on the same patient in quick succession or even to continuously monitor the blood pressure of the patient. Thus it has been proposed to replace the stethoscope by a microphone coupled to an amplifier and to use the electrical impulses thus produced for the registration of the blood pressure (U.S. Patent 2,827,040, German Patents 542,010, 827,-688, French Patent 1,084,208 and patent of addition 659,949 thereto). In the device described in U.S. Patent 2,827,040, the diastolic and systolic blood pressures are indicated on two gauges whose pointers are arrested electromagnetically when the pressure in the sleeve reaches the appropriate value, so as to preserve the measurement until the next measurement is made. All these devices are, however, designed for use in the operating room and are correspondingly complicated.

The object of the present invention is to provide a blood pressure measuring device in which the systolic and diastolic pressures are not listened to by the operator but rather read from a dial, so that the subjective listening is replaced by an objective indication, whereby the measurement can be performed not only by a doctor but also by the patient himself.

Another object of the invention is to provide a blood pressure measuring device by which a permanent record of each measurement may be made.

These and other advantages of the present invention will become apparent from a perusal of the following description taken in connection with the accompanying drawings in which:

FIG. 2 is a perspective view of one embodiment of the indicating and recording portion of the invention;

FIG. 3 is a vertical section of the indicating and recording portion of the invention shown in FIG. 2;

FIG. 4 is a front elevation of the indicating and recording portions of the invention shown in FIG. 2;

FIG. 5 is an elevation of a record card to be used with the indicating and recording portion of the invention shown in FIGS. 2 through 4;

In general, the blood pressure measuring device of this invention consists of a conventional inflatable sleeve connected to two gauges, a microphone with an amplifier and signal rectifier, and two bistable multivibrators, also known as flip-flop circuits, which are so arranged that one of them flips to its conductive state upon arrival of the first amplified and rectified signals picked up by the microphone as a result of the appearance of the pulse and thereby stops the indicator of the first gauge by means of an electromagnet while at the same time preparing the second multivibrator in such a manner that when the signals stop for a period in excess of about two seconds, it will flip to the conducting condition and thereby stop the indicator of the second gauge by means of another electromagnet.

By using transistors exclusively for the electronic part of the apparatus, the size of the entire apparatus can be kept extremely small and a considerable savings in batteries is obtained.

Figure 1:
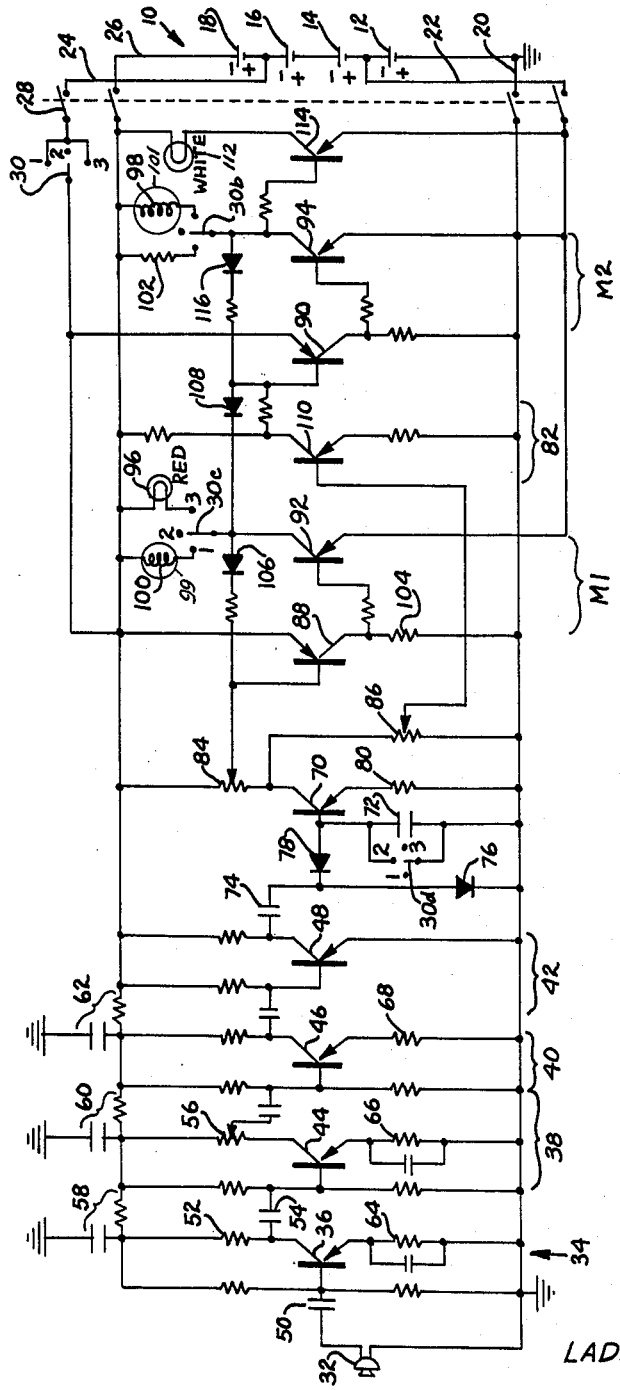
FIG. 1 is a circuit diagram of the electrical portions of the invention.

Referring now to FIG. 1, the power supply for the device of the invention is shown at the extreme right in the form of four flashlight cells 12, 14, 16 and 18. These flashlight cells are so connected that wire 20 will be maintained at ground potential, wire 22 at a potential of −1.5 volts, wire 24 at −4.5 volts, and wire 26 at −6 volts. It will be understood that these voltages are given as a matter of example only and can be varied as required by the particular components used in the circuit. A four pole single throw switch 28 is provided to cut the power supply to the apparatus when it is not in use. The device is operated by means of a four pole, three position switch 30 which may be spring biased to the center position 2. Position 2 of switch 30 is known as the rest position, position 1 is the measuring position, and position 3 is the test position. The purpose of switch 30 will be described hereinafter.

Turning now to the left side of FIG. 1, the circuit operates as follows: a microphone 32 is connected to the input of a first capacity-coupled transistor amplifier stage 34 associated with transistor 36. Stage 34 and the succeeding stages 38, 40 and 42 associated with transistors 44, 46 and 48 respectively, form a capacity-coupled low frequency amplifier having a voltage gain of approximately $10^5$. The signals picked up in the microphone circuit, which have an amplitude of approximately 10 $\mu$v., are fed to the base of transistor 36 through coupling condenser 50. This causes corresponding amplified signals to appear as signal voltages across resistor 52 and which are fed to the base of transistor 44 through coupling condenser 54. The same process has been continued in stages 40 and 42, the exact degree of amplification being adjustable by means of the volume control potentiometer 56. Thus, a signal voltage in the microphone produces an amplified signal of a constant polarity in the collector circuit of transistor 48. In order to render the circuit insensitive to parasitic voltages and changes in the transistor characteristics (as might be caused by temperature variations or the replacement of transistors), R-C filters 58, 60 and 62 have been provided, and negative feedback has been introduced by means of resistors 64, 66 and 68.

The base potential of transistor 70 is determined by the charge stored in the timing capacitor 72. Positive signals appearing at the output of stage 42 through coupling capacitor 74 are shorted to ground through the crystal diode 76. Negative signals, however, are passed through crystal diode 78 into the base circuit of transistor 70. There, the signals cause a charging of capacitor 72. The time constant of the discharge of capacitor 72 through the base-emitter circuit and resistor 80 is approximately two seconds, so that the charge and potential of capacitor 72 does not vary significantly in the interval between two heartbeats.

The multivibrators $M_1$ and $M_2$ are cascade-coupled to the circuit of transistor 70. The coupling of $M_1$ is direct, whereas the coupling of $M_2$ is accomplished through a phase reversal stage 82. The potentiometers 84 and 86 allow the adjustment of the operating points of multivibrators $M_1$ and $M_2$ in such a manner that they remain in the nonconducting condition triggered by the positioning of switch 30 in its rest position 2 even after switch 30 is switched to the measuring position 1 or test position 3, unless signals are present in the circuit. In this nonconducting condition of the multivibrators, the bases of the npn-transistors 88 and 90 are negatively biased with respect to the emitters, so that transistors 88 and 90 are nonconducting and their collectors are at ground potential. This causes the bases of the pnp-transistors 92 and 94 to also be at ground potential. Since their emitters are connected to the −1.5 volt main, they are also blocked; hence, the red light 96 and the resistor 102 (or the electromagnets 100, 98, depending on the position of the switch 30) are not energized.

When switch 30 is in the measuring position 1, the arrival of the first signal causes the base of transistor 70 to become negative as explained above, so that the collector potential of transistor 70 is shifted in the positive direction. This in turn causes the base of transistor 88 to become less negative, 88 starts to conduct, the base potential of 92 becomes more negative because of the voltage drop through resistor 104, and transistor 92 also becomes conductive. The red light 96 lights up, or if switch 30 is in position 1, the pointer of the first pressure gauge 99 is arrested by means of the electromagnet 100. The collector of transistor 92 becomes less negative because of the voltage drop through lamp 96 or electromagnet 100, which condition is transmitted through the diode 106 to the base of transistor 88, thus increasing the original positive signal imparted to the base of transistor 88. Thus, the multivibrator $M_1$ flips to its conductive condition and will remain in the conductive condition even when the signal ceases, because of the feedback through diode 106.

While the diode 108 prevented the flipping of $M_2$ while $M_1$ was in the nonconducting condition, the multivibrator $M_2$ is now unlocked because of the flipping of $M_1$. As soon as the signals now cease, the time delay capacitor 72 discharges, the base of transistor 70 becomes less negative, the collector of 70 and consequently the base of phase reversing transistor 110 becomes more negative, so that the base of transistor 90 receives an increased positive signal and becomes conductive. A flipping process analogous to that of $M_1$ now takes place in $M_2$, i.e. transistor 94 also becomes conductive and resistor 102 or electromagnet 98 becomes energized. If switch 30 is in its measuring position 1, the pointer of the second pressure gauge 101 is arrested by means of the electromagnet 98. The white lamp 112 which is coupled to $M_2$ through transistor 114 so as to be energized as long as multivibrator $M_2$ is nonconducting, goes out when $M_2$ flips to the conducting stage because transistor 114 is blocked by the positive voltage produced at the collector of transistor 94, and hence at the base of transistor 114, when $M_2$ flips to its conducting condition. In the same manner as diode 106, diode 116 serves to maintain the conducting condition of $M_2$. The two multivibrators can be returned to their non-conducting initial condition only by interruption of the −4.5 volt main when switch 30 is returned to its rest position 2. In this rest position of switch 30, the pointers of the two pressure gauges are released, the white lamp 112 relights, and a new measurement can be conducted.

Operation

Figure 7:
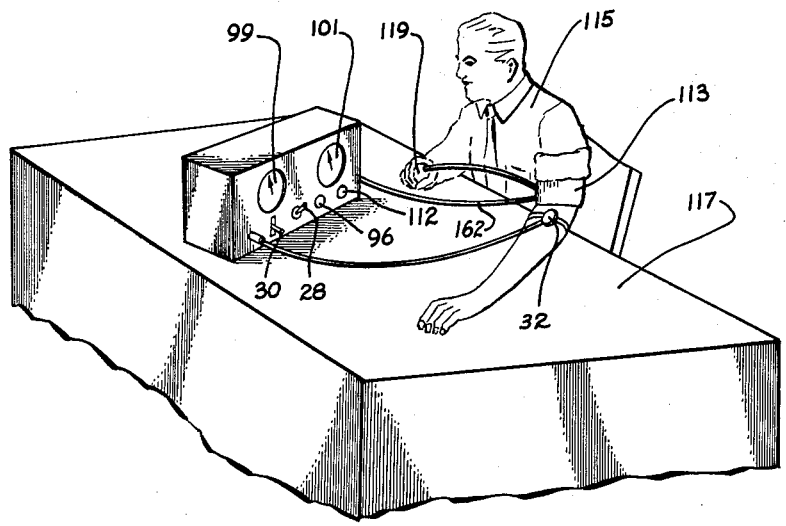
FIG. 7 is a pictorial illustration of the operation of the invention.

The apparatus is turned on by throwing the switch 28. The switch 30 is then brought to its rest position 2. As stated previously, it may, in fact, be desirable to use a telephone-type switch for switch 30 which is biased into its center position 2 and can be thrown against this bias into either position 1 or position 3. The white light 112 should now be lit. The inflatable sleeve 113 (FIG. 7) is now applied to the upper arm of the patient 115 and the microphone 32 is attached inside the patient's elbow. The patient's arm is preferably supported on a table 117 in a relaxed position. The sleeve is then blown up by means of the usual rubber ball 119. When the pressure has risen to about 150 mm. Hg, the switch 30 is thrown to position 3. If the red light lights within the next two seconds, switch 30 is returned to position 2 and the pumping is continued until a renewed switching of switch 30 into position 3 does not cause the red light to light up any more. The switch 30 is then thrown to measuring position 1 and as the sleeve slowly deflates, the air exiting through the rubber ball 119 in the usual manner, the apparatus will take its readings. The completion of the readings is signaled by the extinction of the white light 112. The two pressure gauges 99 and 101 now indicate the systolic and diastolic blood pressure respectively. Switch 30 is now returned to its rest position 2, releasing the indicators of the pressure gauges and causing the white light 112 to light up again. The apparatus is now ready for a new measurement.

Recording the Blood Pressure

Figure 6:
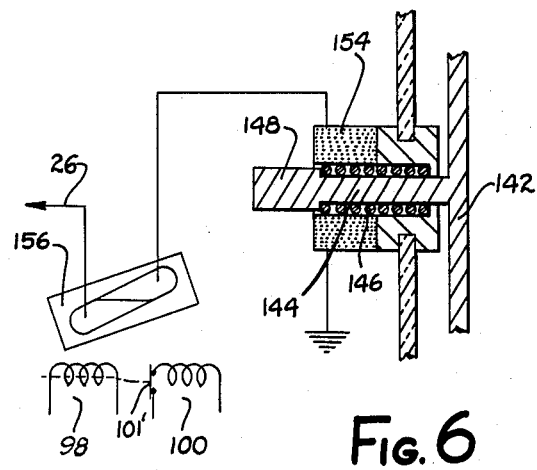
FIG. 6 is a partial vertical section and schematic of a second embodiment of the indicating and recording portion of the invention.

Thus far, the invention has been described in connection with a pair of pressure gauges in which the indicators of the gauges are only temporarily arrested following a measurement, so that a visual observation of their indications is necessary while the measurement is actually being made, or at least before the apparatus is reset for another measurement. FIGS. 2 through 5 show another type of gauge in which a permanent record of the measurement may be made on a card which can then become a part of the patient's permanent file. The housing 122 of the gauge 120 has a slot 124 formed therein, through which a card 126 shaped as shown in FIG. 5 can be inserted. The card 126 is centered by pins 128 fitting into slots 130 of the card. An indicator 132 is mounted on a shaft 134 which is interconnected with and forms part of the standard commercial pressure pick-up portion 136 of gauge 120. The indicator 132 is provided with a pin 138 equipped with a sharp point 140. A disc 142 mounted on shaft 144 and biased to the left in FIG. 3 by a spring 146 can be pushed against the pointer 132 by means of a knob 148, or by an electromagnet such as 154 (FIG. 6). When the disc 142 is thus pushed to the right, it causes the tip of the pointer 132 to move to the right also, and the point 140 of pin 138 penetrates the card 126 opposite the groove 150 in the back plate 152. If the knob 148 is electromagnetically operated, one of the two pressure gauges can be dispensed with by substituting a pencil lead for the pin 138. In this case, the electromagnets 100 and 98 can be used as the pull-in coil and the release coil, respectively, of a bistable relay 156, so that the relay contacts will energize the magnet 154 which thus pulls in the knob 148 only during the time between the flipping of multivibrator $M_1$ and the flipping of multivibrator $M_2$. Inasmuch as electromagnet 100 remains energized even after electromagnet 102 has become energized upon reaching of the diastolic blood pressure, the release coil 102 of bistable relay 156 must be equipped with an additional normally closed contact 101′ which opens the circuit of coil 100 when coil 98 becomes energized. In this case, the record will consist of a pencil line extending from the systolic to the diastolic blood pressure on the paper scale.

Figure 8:
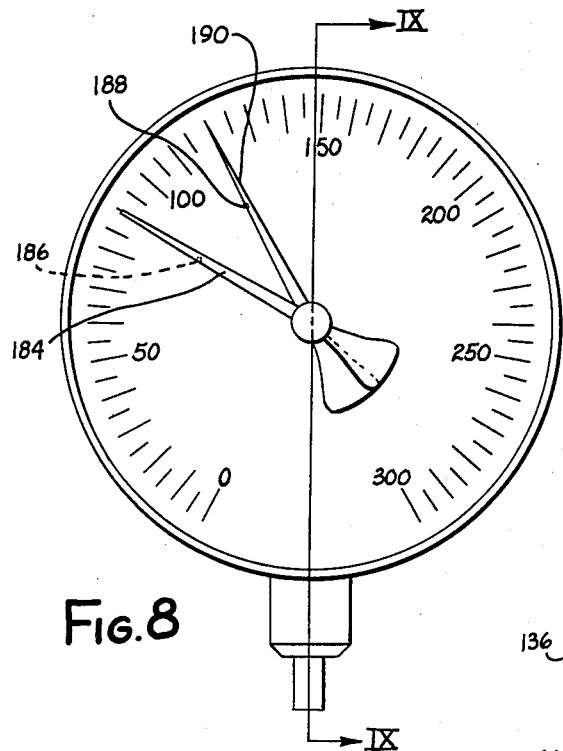
FIG. 8 is a front elevation of a third embodiment of the indicating and recording portion of the invention.
Figure 9:
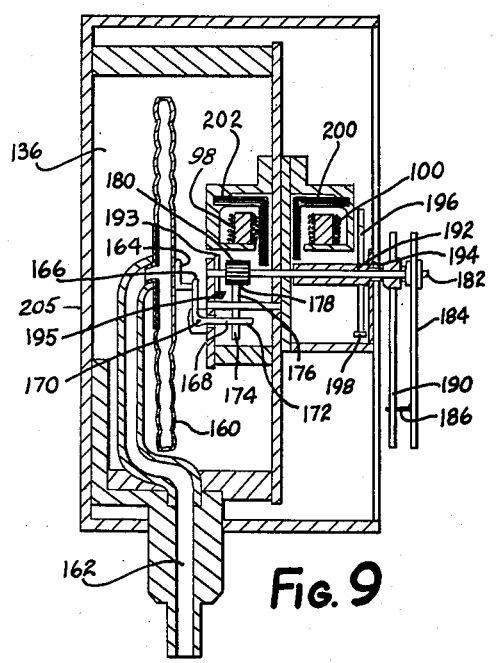
FIG. 9 is a section along line IX—IX of FIG. 8.
Figure 10:
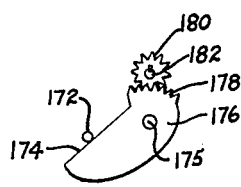
FIG. 10 is a detailed front elevation of the cam used in the embodiment of FIGS. 8 and 9.

Still another embodiment of the invention using a single pressure gauge, but two indicators, is shown in FIGS. 8 through 10. In this embodiment, the pressure gauge used is of the ordinary bellows type, again generally denoted as 136. The gauge 136 comprises a bellows 160, the interior of which is connected to the sleeve 113 through conduit 162. The air intake of the bellows 160 is secured against movement in any well-known manner. For example, the bellows 160 may be supported by a bracket (not shown) which is affixed to the gauge housing 205. Thus, when the bellows 160 expands under the action of pressure in the sleeve 113, the L-shaped bracket 164 pushes against the arm 166 of lever 168 pivoted in a bearing 170. The other arm 172 of lever 168 is thereby pushed downwardly against the surface 174 of a cam 176 pivoted on shaft 175. The teeth 178 of the cam 176 which are all equidistant from shaft 175, engage the teeth of a pinion 180 which is keyed to a shaft 182 supporting an outer indicator 184. The indicator 184 is provided at its end with a dog 186 which engages the notch 188 of an inner indicator 190. The indicator 190 is keyed to a bearing 192 which is freely revolvable around shaft 182. The inner end 194 of a spiral spring 196 is attached to bearing 192. The other end of the spiral spring 196 is attached to a fixed pin 198. A similar spiral spring 193 is connected between pin 195 and shaft 182. A resilient brake 200 is arranged adjacent electromagnet 100 in such a manner that when electromagnet 100 is energized, it will pull brake 200 downwardly against its natural resiliency and into contact with bearing 192, thus arresting indicator 190. Similarly, a resilient brake 202 is provided adjacent electromagnet 98 so that when electromagnet 98 is energized, brake 202 will be brought downwardly into contact with shaft 182 so as to stop indicator 184. The magnets 100 and 98 are, of course, electrically connected into the circuit of FIG. 1 as shown therein.

In operation, an increase in pressure in the sleeve 113 causes bellows 160 to expand, thus causing lever 168 to rotate in a clockwise direction, so that cam 176 is turned in such a manner as to cause pinion 180 to rotate which in turn rotates shaft 182 so that outer indicator 184 will rotate in a clockwise direction in FIG. 8. In so doing, the dog 186 on indicator 184 engages the notch 188 (FIG. 8) of indicator 190, and carries indicator 190 with it until the increase in pressure ceases. As the pressure now slowly diminishes upon deflation of the sleeve 113, indicator 184 moves in the counterclockwise direction under the influence of spiral spring 193, and due to the bias of spring 196, indicator 190 will follow in a counterclockwise direction to the extent that dog 186 will permit. When the systolic blood pressure is reached and coil 100 is energized, the brake 200 descends on bearing 192 and stops any further movement of indicator 190. Indicator 184, however, continues its counterclockwise motion under the influence of spring 193 until, upon reaching the diastolic blood pressure, coil 98 becomes energized and brings brake 202 against shaft 182, thus stopping any further movement of indicator 184. In this condition, indicators 190 and 184 will indicate the systolic and diastolic blood pressure, respectively. Their indications will remain fixed until electromagnets 100 and 98 are released when the operator 115 releases switch 30 to its center position 2. It will be noted that there is no mechanical force other than the springs 193 and 196 to draw either indicator in a counterclockwise direction; hence, very little braking force is required to arrest the indicators.

It will be seen that the present invention provides a simple, compact, and effective blood pressure measuring device which can be readily used by unskilled personnel, and which will always give a quick and accurate reading. Obviously, many embodiments of the invention are possible, and it is therefore not desired that the invention be limited except by the scope of the following claims.

We claim:

1. A blood pressure measuring device comprising an inflatable sleeve, a microphone, an amplifier connected to said microphone for amplifying pulse beat signals picked up by said microphone, a first bistable multivibrator connected to said amplifier so as to be flipped from its nonconducting condition to its conducting condition when a signal is picked up by said microphone, a second bistable multivibrator so connected as to be flipped from its nonconducting condition to its conducting condition when no signal is picked up by said microphone, time delay means for retaining said second multivibrator in its nonconducting condition for a predetermined time following the cessation of a signal, blocking means associated with said first multivibrator for retaining said second multivibrator in its nonconducting condition as long as said first multivibrator is in its nonconducting condition, indicating means associated with said inflatable sleeve for providing an at least temporarily persisting indication of the pressures at which said flippings occur, and resetting means for returning both multivibrators to their nonconducting conditions.

2. The device of claim 1, in which said persisting indication is a permanent record on an information-bearing medium.

3. A blood pressure measuring instrument comprising an inflatable sleeve (113), means (119) for initially pressurizing said sleeve to a pressure in excess of the systolic pressure to be measured, means (101 and 99) for visually indicating when the pressure in said sleeve is above the systolic pressure to be measured, means (119) for slowly reducing the pressure in said sleeve to a value below the diastolic pressure to be measured, a microphone (32) adapted to detect the occurrence of systolic Korotkoff sounds and produce electrical signals in response to said sounds, an amplifier (34) connected to said microphone, a first bistable multivibrator ($M_1$) connected to said amplifier so as to be flipped from its first stable condition to its second stable condition upon the occurrence of the first systolic Korotkoff sound as the pressure in said sleeve passes through systole, a second bistable multivibrator ($M_2$) connected to said amplifier so as to be flipped from its first stable condition to its second stable condition upon the cessation of Korotkoff sounds when the pressure in said sleeve is reduced to the diastolic value, means (106) for retaining said first multivibrator in said second stable condition, and indicating means (101, 99, 98, 100) associated with said inflatable sleeve for providing an at least temporarily persisting indication of the pressure at which said flippings occur, and resetting means (30) for returning both multivibrators to said first conditions.

References Cited in the file of this patent

UNITED STATES PATENTS

| | | |
|---|---|---|
| 281,302 | Rose | July 17, 1883 |
| 1,594,581 | Uehling | Aug. 3, 1926 |
| 1,690,671 | Dressler | Nov. 6, 1928 |
| 1,910,796 | Hill | May 23, 1933 |
| 2,756,741 | Campanella | July 31, 1956 |
| 2,827,040 | Gilford | Mar. 18, 1958 |
| 2,865,365 | Newland | Dec. 23, 1958 |
| 2,875,750 | Boucke | Mar. 3, 1959 |

FOREIGN PATENTS

| | | |
|---|---|---|
| 772,284 | France | Aug. 13, 1934 |